(12) United States Patent
Okumura et al.

(10) Patent No.: US 6,412,290 B1
(45) Date of Patent: Jul. 2, 2002

(54) CRYOGENIC REFRIGERATING DEVICE

(75) Inventors: Nobuo Okumura, Toyota; Takanori Hamajima, Aichi-ken, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/691,264

(22) Filed: Oct. 19, 2000

(30) Foreign Application Priority Data

Oct. 19, 1999 (JP) .............................. 11-296636
Oct. 10, 2000 (JP) ........................... 2000-309235

(51) Int. Cl.[7] .............................. B01D 8/00; F25B 9/00
(52) U.S. Cl. .............................................. 62/55.5; 62/6
(58) Field of Search ....................... 62/55.5, 6

(56) References Cited

U.S. PATENT DOCUMENTS

| | | | | |
|---|---|---|---|---|
| 3,992,685 A | * | 11/1976 | Ogren et al. | 331/94.5 G |
| 4,514,698 A | * | 4/1985 | Blumenthal et al. | 330/4.3 |
| 5,357,760 A | * | 10/1994 | Higham | 62/55.5 |
| 5,647,219 A | * | 7/1997 | Rattray et al. | 62/6 |
| 5,720,174 A | * | 2/1998 | Gorinas et al. | 62/55.5 |
| 5,855,118 A | * | 1/1999 | Lorimer | 62/55.5 |
| 6,154,478 A | * | 11/2000 | Vetrovec | 372/89 |

* cited by examiner

*Primary Examiner*—William C. Doerrler
(74) *Attorney, Agent, or Firm*—Oblon, Spivak, McClelland, Maier & Neustadt, P.C.

(57) ABSTRACT

A cryogenic refrigerating device comprising includes an adiabatic vacuum tank, a refrigerator having at least a low temperature generating portion of the refrigerator accommodated in the adiabatic vacuum tank, an adsorption panel attached to the low temperature generating portion of the refrigerator at a location for adsorbing molecules floating in a vacuum in the adiabatic vacuum tank, and a selective sorbing device provided in the adiabatic vacuum tank at a location for sorbing selected molecules floating in the adiabatic vacuum tank. The molecules in the adiabatic vacuum tank are adsorbed by either the panel or by the adsorbing device for keeping the vacuum pressure level in the tank constant for a long period of time.

20 Claims, 1 Drawing Sheet

CRYOGENIC REFRIGERATING DEVICE

BACKGROUND OF THE INVENTION

The entire disclosure of Japanese Patent Applications No. Hei 11-296636 filed on Oct. 19, 1999 and No. 2000-309235 filed on Oct. 10, 2000 including the specification, drawings and abstract is incorporated herein by reference in its entirety.

BACKGROUND OF THE INVENTION

1. Field of the Invention

This invention relates to a cryogenic refrigerating device, and more particularly to a cryogenic refrigerating device having an adiabatic vacuum tank and a refrigerator accommodated in the adiabatic vacuum tank.

2. Description of Related Art

It is necessary for an electronic device to be refrigerated to a temperature level of liquefied nitrogen (about 80K) in order to maintain or to generate a particular characteristic thereof. This type of cryogenic refrigeration is often achieved by a refrigerator such as GM (Gifford-McMahon) type refrigerator or pulse tube refrigerator for cooling the electronic device. In order to minimize the effect of external heat, such refrigeration is carried out in an adiabatic vacuum tank. Therefore, such a refrigerating device generally includes an adiabatic vacuum tank and a refrigerator disposed in the tank.

The conventional refrigerating device, however, has a drawback in that the pressure in the adiabatic vacuum tank increases due to molecules released from the metal inner surface of the tank or molecules adhered on the inner wall of the tank and released therefrom. This pressure increase in the tank has been prevented by various means hitherto proposed. One such proposal is to provide a vacuum pump within the adiabatic vacuum tank. According to this proposal, the molecules generated and released in the tank are discharged by the vacuum pump.

Another proposal is to provide a panel (adsorption panel) to which is attached a porous material, such as activated carbon, in the cold head portion (low temperature generating portion) of the refrigerator accommodated in the adiabatic vacuum tank. According to this proposal, molecules floating in the cold head portion of the refrigerator are adsorbed and trapped in the panel. This will prevent an increase of the pressure in the tank.

A further proposal is to provide a hydrogen storage alloy (for example, vanadium alloy) in the adiabatic vacuum tank. According to this proposal, the hydrogen molecules are stored in the hydrogen storage alloy, and other molecules having a relatively high freezing point (for example oxygen molecules) are chemically reacted with the hydrogen storage alloy to generate a chemical compound such as oxide (vanadium oxide), and so are kept in the alloy.

These proposals, however, have certain drawbacks. According to the first proposal of providing a vacuum pump in the adiabatic vacuum tank, the vacuum level in the tank is limited to the capacity of the vacuum pump. In order to obtain a desired high vacuum level in the tank, the vacuum pump has to be large and expensive. This leads to high cost and a larger size refrigerating device as a whole. Further, it is necessary to provide an additional driving source and device for driving the vacuum pump in addition to the driving of the refrigerator itself. The consumption of energy becomes large and the refrigeration system cannot maintain the vacuum within the system independent of the vacuum pump.

According to the second proposal of providing an adsorption panel, while it needs no vacuum pump, the adsorption panel cannot trap molecules such as hydrogen molecules having a freezing point below the ambient temperature of liquefied nitrogen level (about 80K). The vacuum level may therefore increase over time due to the release of hydrogen molecules from the tank inner wall. This problem may be addressed by improving the performance capacity of the refrigerator to lower the temperature at the cold head to about 20K so that even the hydrogen molecules may be trapped in the panel. It is, however, not realistic to improve the capacity of refrigerator just for the purpose of trapping the molecules, because the basic role of the refrigerator is to cool the electronic devices to be refrigerated and not to trap gas molecules. Also, excess cooling or refrigeration may reduce the performance of the electronic devices to be cooled.

According to the third proposal of providing the hydrogen storage alloy, it can store the hydrogen molecules in the alloy and at the same time keep the other molecules of higher freezing point in the alloy as chemical components by chemical reaction with the alloy. However, the amount of other molecules of higher freezing point to be kept in the alloy is very small compared to the hydrogen molecules and accordingly the hydrogen storage alloy has to be re-activated by being heated to 500 to 800° C. This heating requires a heating device, which leads to an increase in consumption of electric power. Further, during the operation of the refrigerating device, such reactivation has to be done frequently.

As stated, the conventional proposals are unable to provide an inexpensive cryogenic refrigerating device having an adiabatic vacuum tank, or such a tank capable of long time stable operation to keep the vacuum at a constant level.

SUMMARY OF THE INVENTION

It is therefore, an object of the present invention to provide an improved cryogenic refrigerating device which can obviate the above conventional drawbacks.

It is another object of the present invention to provide an improved cryogenic refrigerating device having an adiabatic vacuum tank and a refrigerator, a part thereof formed integrally with the adiabatic vacuum tank, without increasing the cost, and yet capable of keeping the vacuum level in the adiabatic vacuum tank to a desired and stable level for a relatively longer time or for a lifetime of operation.

According to the present invention, a cryogenic refrigerating device includes an adiabatic vacuum tank, a refrigerator having at least a low temperature generating portion (a cold head portion) thereof being disposed in the adiabatic vacuum tank, an adsorption panel attached to the low temperature generating portion of the refrigerator, and a hydrogen sorbing device provided in the adiabatic vacuum tank for sorbing the hydrogen molecules therein.

According to the present invention, the adsorption panel attached to the low temperature generating portion of the refrigerator adsorbs molecules other than the hydrogen in the adiabatic vacuum tank, and a hydrogen sorbing device provided in the adiabatic vacuum tank sorbs the hydrogen molecules selectively. The adsorption panel adsorbs molecules of relatively high freezing point in the adiabatic vacuum tank and the hydrogen sorbing device sorbs hydrogen molecules of lower freezing point in the adiabatic vacuum tank selectively, so that most of the molecules in the adiabatic vacuum tank may be trapped either in the adsorption panel or in the hydrogen sorbing device.

The adsorption panel may include an activated carbon layer or molecular sieve for adsorbing the relatively high freezing point molecules in the adiabatic vacuum tank. The hydrogen sorbing device is formed for sorbing molecules of lower freezing point such as hydrogen and may include hydrogen storage alloys such as vanadium alloy or zirconium alloy.

During the operation of the cryogenic refrigerating device, relatively high freezing point molecules such as oxygen or nitrogen are adsorbed by the adsorption panel provided on the low temperature generating portion of the refrigerator and relatively low freezing molecules such as hydrogen are adsorbed by the hydrogen sorbing device provided in the adiabatic vacuum tank. Accordingly, the hydrogen molecules in the adiabatic vacuum tank are sorbed by the hydrogen sorbing device and the molecules other than hydrogen are adsorbed by the adsorption panel, to thereby sorb most of the molecules generated or present in the adiabatic vacuum tank during operation, thereby to keep the vacuum level in the tank to a desired level for a long time.

This structure does not include a vacuum pump and yet keeps the vacuum level in the tank constant by use of the cryogenic refrigerating device itself, without using an external driving device. This structure is advantageous in cost and in size.

The molecules which cannot be adsorbed by the adsorption panel can be sorbed by the hydrogen storage material. This will keep the vacuum level in the adiabatic vacuum tank constant for long time without increasing the pressure in the tank due to the generation of the hydrogen or other molecules.

This structure is further advantageous because the hydrogen molecules are sorbed by a hydrogen sorbing device, and molecules other than hydrogen are adsorbed by a different adsorbing means (adsorption panel). This does not generate chemical components due to the chemical reaction of the hydrogen with other molecules. Accordingly, it is not necessary to reactivate the hydrogen sorbing device, which accordingly needs no extra devices such as a heating device for reactivation. The working efficiency is also improved by not reactivating the hydrogen adsorbing device during the operation.

The molecules in the adiabatic vacuum tank are molecules remaining in the vacuum in the tank, molecules released from the inner wall of the tank, and molecules once stored in the inner wall of the tank and then released. Molecules remaining in the vacuum tank are mainly nitrogen $N_2$ and oxide $O_2$, molecules released from the inner wall of the tank are mainly $H_2O$, and molecules stored in the inner wall and then released are mainly $H_2$.

According to another aspect of the present invention, in addition to the structure above, the hydrogen adsorbing device is a hydrogen storage alloy. The hydrogen storage alloy includes a relatively large amount of hydrogen solid solution for hydrogen sorbing, and it is not necessary to change the alloy due to the saturation of the hydrogen solid solution for the lifetime of the refrigerating device. This will reduce the running cost of the device.

According to a further aspect of the present invention, the refrigerator is connected to an uninterruptible power source. Since the refrigerator is connected to the uninterruptible power source, should the power fail, the refrigerating device can continue in its operation. If the refrigerating system were to stop suddenly, the low temperature generating portion (cold head portion) would not be cooled and the adsorbed molecules in the panel may again be released in the adiabatic vacuum tank. When the power is supplied again to operate the refrigerating device, the vacuum level in the adiabatic vacuum tank would already have been reduced and the heat insulating function would be poor, which may lead to heat invasion into the tank. Thus the cold head portion could not generate the low temperature necessary not to again adsorb the molecules once released in the vacuum. The refrigerator accordingly could not function sufficiently to comply with the required refrigeration performance.

In the structure above, the refrigerator is connected to an uninterruptible power source to continue the refrigeration operation even when the power supply stops for a predetermined period. During this time, the device can be connected to an emergency power generating system.

As to the adsorption panel, any panel may be used as long as molecules other than hydrogen can be adsorbed. It is preferable to use a panel made of good heat conductive material and connected to the low temperature generating portion of the refrigerator. The panel may include activated carbon or a molecular sieve attached to the panel.

As to the hydrogen storage alloy, any alloy may be used as long as the hydrogen molecules can be sorbed and stored. It is preferable to use vanadium alloy or zirconium alloy.

According to a further aspect of the invention, the cryogenic refrigerating device includes an adiabatic vacuum tank, a low temperature generating portion (a cold head portion) of a refrigerator being disposed in the adiabatic vacuum tank, an adsorption panel attached to the low temperature generating portion of the refrigerator for adsorbing molecules floating in the vacuum in the adiabatic vacuum tank, and a selectively sorbing device provided in the adiabatic vacuum tank for selectively sorbing particular molecules.

According to the structure above, the particular molecules, e.g., hydrogen molecules, cannot be adsorbed by the adsorption panel, and the sorbing device may be a hydrogen storage alloy. According to the structure above, the refrigerator is connected to an uninterruptible power source.

Since the cryogenic refrigerating device includes at least a low temperature generating portion (a cold head portion) of a refrigerator disposed in the adiabatic vacuum tank, an adsorption panel attached to the low temperature generating portion of the refrigerator for adsorbing molecules floating in the vacuum in the adiabatic vacuum tank, and a selectively sorbing device provided in the adiabatic vacuum tank for selectively sorbing particular or selected molecules such as hydrogen which could not be adsorbed by the adsorption panel, the molecules in the adiabatic vacuum tank are sorbed by either the panel or by the sorbing means for keeping the vacuum pressure level in the tank constant for a long period of time.

According to a further aspect of the invention, the cryogenic refrigerating device includes an adiabatic vacuum tank, a low temperature generating portion (a cold head portion) of a refrigerator disposed in the adiabatic vacuum tank, an adsorption panel attached to the low temperature generating portion of the refrigerator for adsorbing molecules floating in the vacuum in the adiabatic vacuum tank and having high freezing point, and a selectively sorbing device provided in the adiabatic vacuum tank for selectively sorbing particular molecules floating in the adiabatic vacuum tank, in which the particular molecules sorbed by the selectively sorbing device have a freezing point lower than the freezing point of the molecules adsorbed by the adsorption panel.

According to the structure above, the particular molecules are hydrogen molecules, and the adsorbing device is a hydrogen storage alloy. According to the structure above, the refrigerator is connected to an uninterruptible power source.

Since cryogenic refrigerating device includes an adiabatic vacuum tank, a low temperature generating portion (a cold head portion) of a refrigerator disposed in the adiabatic vacuum tank, an adsorption panel attached to the low temperature generating portion of the refrigerator for adsorbing molecules floating in the vacuum in the adiabatic vacuum tank and having high freezing point, and a selectively sorbing device provided in the adiabatic vacuum tank for selectively sorbing particular molecules such as hydrogen which have a freezing point lower than the freezing point of the molecule adsorbed by the adsorption panel, the molecules in the adiabatic vacuum tank are sorbed by either the panel or by the sorbing device for keeping the vacuum pressure level in the tank constant for a long period of time.

BRIEF DESCRIPTION OF THE DRAWING

These and further objects of the present invention will become more apparent when considered with the accompanying drawing, in which the sole FIGURE shows a cross sectional view of a cryogenic refrigerating device according to the embodiment of the invention.

DETAILED DESCRIPTION OF THE PREFERRED EMBODIMENT

Figure 1:
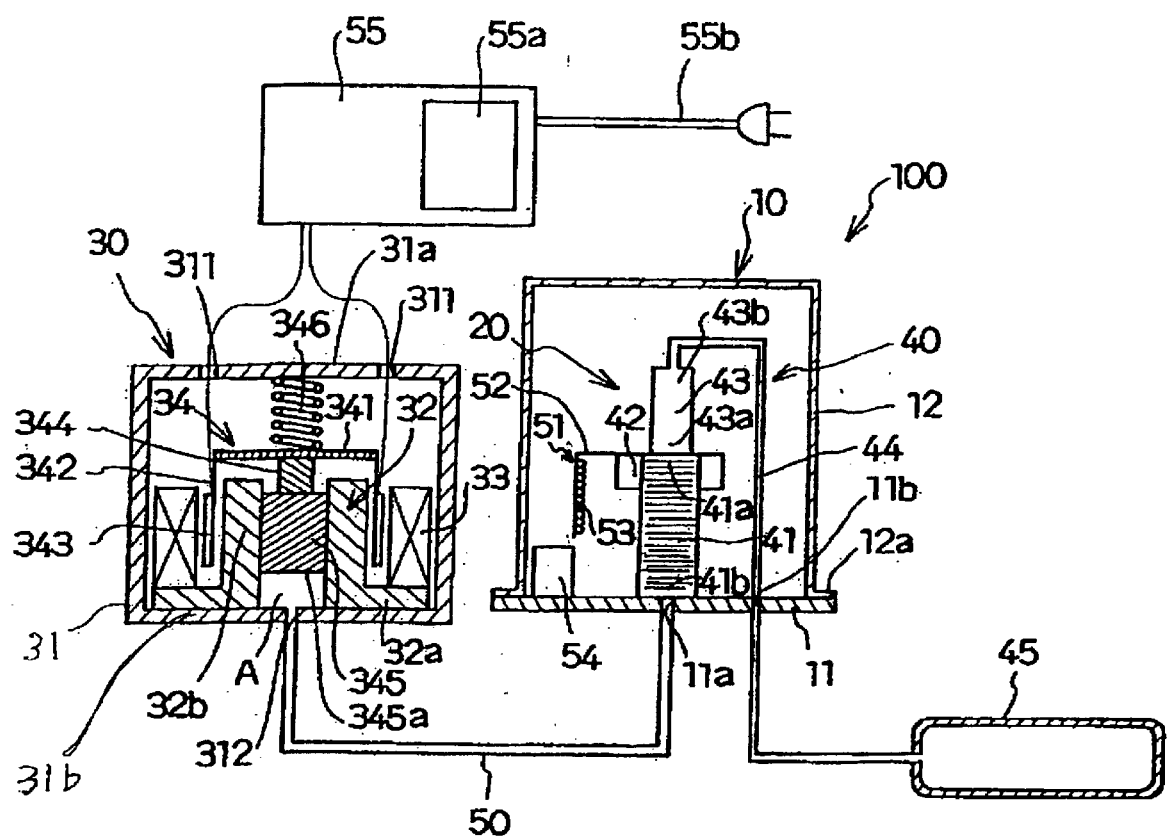

Referring now to the attached drawing, a cryogenic refrigerating device 100 according to the invention includes an adiabatic vacuum tank 10 and a pulse tube refrigerator 20 assembled partly in the adiabatic vacuum tank 10.

The adiabatic vacuum tank 10 includes a disc bottom plate 11 and a cylindrical cover 12, the lower end of which is open. The bottom plate 11 is arranged to cover the opening of the cylindrical cover 12. The cover 12 is provided with a flange portion 12a at the open end for connecting the cover 12 with the bottom plate 11 in a fluid tight connection.

The pulse tube refrigerator 20 is mainly composed of a compression portion 30 and an expansion portion 40, both portions 30, 40 being connected by a conduit 50.

The compression portion 30 in this embodiment is external to the vacuum tank 10 and includes a linear motor type compressor. In more detail, the compressor 30 includes a housing 31, a fixed member 32 provided in the housing 31, a permanent magnet 33 secured to the fixed member 32 and a movable member 34.

The housing 31 is cylindrically shaped with a pair of holes 311 provided on one end 31a of the housing 31 for connecting a coil 343 (later explained in detail) to an external driving device 55 which will be also explained later.

The fixed member 32 provided in the housing 31 is comprised of a disc-like flange portion 32a facing and contacting the other end 31b of the housing 31 and a cylindrical portion 32b extending vertically upward from the inner peripheral portion of the flange portion 32a.

The permanent magnet 33 is ring-shaped and is attached to the flange portion 32a of the fixed member 32.

The movable member 34 includes a disc-like supporting portion 341, a bobbin 342, the coil 343 wound around the bobbin 342, a rod 344 extending downward from the central portion of the supporting portion 341 and coaxial with the supporting portion 341, a piston 345 connected to the top end (lower end as viewed in the drawing) of the rod 344, and a spring 346 one end of which is connected to the upper surface of the supporting portion 341 and the other end of which is connected to the inner wall of the housing 31 to support the movable member 34.

As shown in the drawing, the bobbin 342 and the coil 343 wound around the bobbin 342 are arranged to be positioned in a gap between the ring shaped permanent magnet 33 and the cylindrical portion 32b of the fixed member 32.

The piston 345 is arranged to be positioned within the cylinder portion 32b of the fixed member 32 and is slidably movable within the cylinder portion 32b. Accordingly, a compression chamber A is formed between the front surface 345a of the piston 345 and the inner walls of the cylinder portion 32b and the housing 31.

A hole 312 is provided in the housing 31 and connects the compression chamber A with the conduit 50. The other end of the conduit 50 is connected to a hole 11a provided in the bottom plate 11 of the adiabatic vacuum tank 10.

The expansion portion 40 of the pulse tube refrigerator 20 includes a regenerator 41 which has a lower temperature end 41a, and a high temperature end 41b, cold head or low temperature generating portion 42 thermally connected to the low temperature end 41a of the regenerator 41, a pulse tube 43 having a low temperature end 43a and a high temperature end 43b and communicating with the low temperature end 41a of the regenerator 41 at the low temperature end 43a of the pulse tube 43, and a buffer tank 45 communicating with the high temperature end 43b of the pulse tube 43 via a conduit 44.

The high temperature end 41b of the regenerator 41 is in communication with the conduit 50 via the hole 11a of the bottom plate 11 of the adiabatic vacuum tank 10. Accordingly, the compression chamber A is in communication with the regenerator 41, pulse tube 43, conduit 44 and the buffer tank 45, via conduit 50.

The cold head 42 is in contact with a device to be cooled such as an electronic device (not shown) for refrigerating the same. The cold head 42 has an adsorption panel 51 attached thereto. The adsorption panel 51 includes a panel plate 52 made of highly heat conductive material, which is secured to the cold head, and may include an activated carbon layer 53, or a molecular sieve, attached to the panel surface for adsorbing molecules.

A hydrogen storage alloy 54 is provided in the adiabatic vacuum tank 10 for sorbing the hydrogen molecules in the tank 10. The alloy used in this embodiment is a vanadium alloy, although others may be used.

The coil 343 of the movable member 34 is electrically connected to the driving device 55 (in this embodiment, an inverter) via leads extending through the holes 311. The driving device 55 includes an internal uninterruptible power source 55a, for example one having a back-up battery. The driving device 55 is connected to a source of electrical current, for example by an electrical plug 55b which is to be connected to a commercial power source (not shown). Electric power is thus supplied to the driving device 55 via the uninterruptible power source 55a.

As seen from the drawing, the conduit 44 connected to the high temperature end 43b of the pulse tube 43 extends out of the tank 10 through the hole 11b of the bottom plate 11 of the vacuum tank 10 and then is connected to the buffer tank 45.

The portions of the pulse tube refrigerator 20 disposed within the vacuum tank 10 are regenerator 41, cold head 42, pulse tube 43, and a part of the conduit 44.

Operation of the cryogenic refrigerating device of this invention will be as follows:

First, the adiabatic vacuum tank 10 is placed in a vacuum condition using a roughing pump before initiating the operation. Then the pulse tube refrigerator 20 is driven by the uninterruptible power source 55b and the driving device (inverter) 55, which supply electricity to the coil 342. The coil 342 then begins vertically reciprocating by the electromagnetic induction. This reciprocation of the coil 342 causes the reciprocation of the entire movable member 34 as a damped oscillating spring system in conjunction with the force of spring 346 elastically supporting the movable member 34.

The piston 345 then slidably moves in a vertical direction within the cylinder portion 32b, and the operating gas in the compression chamber A is repeatedly expanded and compressed. This expansion and compression of the operating gas is transmitted to the expansion portion 40 via conduit 50 to generate cryogenic refrigeration at the cold head 42, which cools the device to be refrigerated such as an electronic device.

During the operation of the cryogenic refrigerating device 100, residual molecules such as $N_2$, $O_2$ in the vacuum tank 10, released molecules such as $H_2O$ from the inner wall of the vacuum tank 10, and molecules such as $H_2$ once stored in the inner wall of the tank 10 and released therefrom, float in the vacuum tank 10.

The temperature of the cold head 42 is supposed to be kept at about 80K, so that the kinetic energy of molecules of relatively high freezing point such as $N_2$, $O_2$ or $H_2O$ floating around the cold head 42 becomes small enough for them to be adsorbed onto the activated carbon 53 of the adsorption panel 51 at the temperature of 80K at the cold head 42. However, the kinetic energy of molecules of relatively low freezing point floating around the cold head (at 80K) is large enough that they are not adsorbed by the activated carbon 53. But the particular molecules such as hydrogen which are not adsorbed by the activated carbon are selectively sorbed by the hydrogen storage alloy 53.

If the commercial electric power supply fails suddenly due to a black-out, the operation of the pulse tube refrigerator 20 continues by the backup of the uninterruptible power supply 55a. During such emergency operation, steps can be taken to address the cause of the power outage or connect to an emergency back up generator without stopping the operation of the refrigerator 20.

Accordingly, the cryogenic refrigerating device 100 of this embodiment includes an adiabatic vacuum tank 10, a pulse tube refrigerator 20 accommodated in the adiabatic vacuum tank 10 with at least a low temperature generating portion 42 (a cold head portion) thereof being disposed in the adiabatic vacuum tank 10, an adsorption panel 51 attached to the low temperature generating portion 42 of the pulse tube refrigerator 20 for adsorbing molecules of relatively high freezing point other than hydrogen floating in the vacuum in the adiabatic vacuum tank 10, and a sorbing device 54 (e.g., hydrogen storage alloy) provided in the adiabatic vacuum tank 10 for selectively sorbing particular molecules (hydrogen molecules) which cannot be adsorbed by the adsorption panel 51.

The molecules in the adiabatic vacuum tank are almost entirely sorbed by either the panel or by the sorbing device, thereby keeping the vacuum pressure level in the tank constant for a long period of time.

Further, the device 100 of this invention is advantageous in cost and space because it does not use a costly and large vacuum pump, and also the device 100 can keep the vacuum level in the vacuum tank constant without using any additional means.

Further, molecules such as hydrogen which cannot be adsorbed by the panel 51 can be sorbed by the hydrogen storage alloy or hydrogen sorbing device 54 to maintain the pressure in the vacuum tank 10 at a constant level for a long time period.

This structure is further advantageous because sorbing the hydrogen molecules by a hydrogen sorbing device (hydrogen storage alloy 54) and adsorbing molecules other than hydrogen by different adsorbing means (adsorption panel 51) does not generate any chemical components due to chemical reactions of the hydrogen with other molecules in the hydrogen sorbing device. Accordingly, it is not necessary to reactivate the hydrogen sorbing device (hydrogen storage alloy 54), which accordingly needs no extra devices such as a heating device for reactivation and the electric power therefor.

The working efficiency is also improved by not reactivating the hydrogen sorbing device during the operation.

The hydrogen storage alloy includes a relatively large amount of hydrogen solid solution as a hydrogen storage alloy 54, and it is not necessary to exchange the alloy due to the saturation of the hydrogen solid solution for the lifetime of the refrigerating device 100. This reduces the running cost of the device.

According to a further aspect of the present invention, the pulse tube refrigerator 20 is connected to an uninterruptible power source 55a. Since the refrigerator is connected to the uninterruptible power source 55a, should power fail due to a blackout, the refrigerating device 100 can continue in its operation. If the refrigerating system were to stop suddenly, the low temperature generating portion (cold head portion 42) would not be cooled and the adsorbed molecules in the panel 51 may again be released in the adiabatic vacuum tank 10. Also, when power is supplied again to operate the refrigerating device, the vacuum level in the adiabatic vacuum tank 10 would already be reduced and the heat insulating function would not be good, which may lead to heat invasion into the tank. Thus the cold head portion cannot generate the low temperature needed not to again adsorb the molecules released into the vacuum. The refrigerator accordingly could not function to comply with the required refrigeration performance.

In the structure above, the refrigerator is connected to an uninterruptible power source 55a so as to continue the refrigeration operation even when the power supply fails for a predetermined period. During this time, the power failure problem can be addressed, such as by connecting to an emergency generating system, and the refrigeration is not interrupted.

According to the present invention, the cryogenic refrigerating device is inexpensive in structure, without any additional means such as a vacuum pump or driving device therefor, and yet can keep the vacuum level constant for the lifetime of the device and be capable of efficient operation.

It is intended that the foregoing detailed description be regarded as illustrative rather than limiting and that it is understood that the following claims including all equivalents are intended to define the scope of the invention.

What we claim is:

1. A cryogenic refrigerating device comprising:
   an adiabatic vacuum tank;
   a refrigerator having at least a low temperature generating portion of the refrigerator accommodated in the adiabatic vacuum tank;
   an adsorption panel attached to the low temperature generating portion of the refrigerator at a location for adsorbing molecules other than hydrogen floating in a vacuum in the adiabatic vacuum tank; and
   a hydrogen sorbing device provided in the adiabatic vacuum tank at a location for sorbing hydrogen molecules float in the adiabatic vacuum tank.

2. A cryogenic refrigerating device according to claim 1, wherein the hydrogen sorbing device comprises a hydrogen storage alloy.

3. A cryogenic refrigerating device according to claim 1, further comprises an uninterruptible power source connected to the refrigerator.

4. A cryogenic refrigerating device according to claim 1, wherein the adsorption panel comprises an activated carbon or a molecular sieve.

5. A cryogenic refrigerating device according to claim 1, wherein the refrigerator is a pulse tube refrigerator.

6. A cryogenic refrigerating device according to claim 2, wherein the hydrogen storage alloy includes a vanadium alloy or zirconium alloy.

7. A cryogenic refrigerating device comprising:

an adiabatic vacuum tank;

a refrigerator having at least a low temperature generating portion of the refrigerator accommodated in the adiabatic vacuum tank;

an adsorption panel attached to the low temperature generating portion of the refrigerator at a location for adsorbing molecules other than hydrogen floating in a vacuum in the adiabatic vacuum tank; and a selective sorbing device provided in the adiabatic vacuum tank at a location for sorbing selected molecules floating in the adiabatic vacuum tank.

8. A cryogenic refrigerating device according to claim 7, wherein the adsorption panel adsorbs molecules other than the selected molecules.

9. A cryogenic refrigerating device according to claim 7, wherein the selected molecules are hydrogen molecules.

10. A cryogenic refrigerating device according to claim 7, wherein the selectively sorbing device includes a hydrogen storage alloy.

11. A cryogenic refrigerating device according to claim 10, wherein the hydrogen storage alloy includes a vanadium alloy or zirconium alloy.

12. A cryogenic refrigerating device according to claim 10, wherein the selectively sorbing device includes a hydrogen storage alloy for which reactivation is unnecessary for a lifetime thereof.

13. A cryogenic refrigerating device according to claim 7, wherein the adsorption panel comprises an activated carbon or a molecular sieve.

14. A cryogenic refrigerating device according to claim 7, wherein the refrigerator is connected to an uninterruptible power source.

15. A cryogenic refrigerating device comprising:

an adiabatic vacuum tank;

a refrigerator having at least a low temperature generating portion of the refrigerator accommodated in the adiabatic vacuum tank;

an adsorption panel attached to the low temperature generating portion of the refrigerator at a location for adsorbing molecules other than hydrogen floating in a vacuum in the adiabatic vacuum tank; and a selective sorbing device provided in the adiabatic vacuum tank at a location for sorbing hydrogen molecules floating in the adiabatic vacuum tank, said hydrogen molecules having a freezing point which is lower than a freezing point of molecules adsorbed by the adsorption panel.

16. A cryogenic refrigerating device according to claim 15, wherein the selected molecules are hydrogen molecules.

17. A cryogenic refrigerating device according to claim 15, wherein the selectively sorbing means includes a hydrogen storage alloy.

18. A cryogenic refrigerating device according to claim 17, wherein the hydrogen storage alloy includes a vanadium alloy or zirconium alloy.

19. A cryogenic refrigerating device according to claim 15, wherein the adsorption panel comprises an activated carbon or a molecular sieve.

20. A cryogenic refrigerating device according to claim 15, wherein the refrigerator is connected to an uninterruptible power source.

* * * * *